(12) United States Patent
Demicheli

(10) Patent No.: US 8,596,191 B2
(45) Date of Patent: Dec. 3, 2013

(54) OHMIC DEVICE FOR HEAT-TREATING FOODS

(75) Inventor: Luigi Demicheli, Pontenure (IT)

(73) Assignee: Alfa Laval SpA, Milan (IT)

( * ) Notice: Subject to any disclaimer, the term of this patent is extended or adjusted under 35 U.S.C. 154(b) by 325 days.

(21) Appl. No.: 12/902,854

(22) Filed: Oct. 12, 2010

(65) Prior Publication Data

US 2011/0088569 A1    Apr. 21, 2011

(30) Foreign Application Priority Data

Oct. 12, 2009   (IT) .............................. RE2009A0100

(51) Int. Cl.
*A23C 3/02* (2006.01)
*H05B 1/00* (2006.01)

(52) U.S. Cl.
USPC ............................................ 99/483; 219/201

(58) Field of Classification Search
USPC ..................... 99/483, 516; 219/201; 198/661; D15/10, 28
See application file for complete search history.

(56) References Cited

U.S. PATENT DOCUMENTS

| | | | | |
|---|---|---|---|---|
| 4,358,029 | A | * | 11/1982 | Yomoda ......................... 222/133 |
| 4,630,534 | A | * | 12/1986 | Tsuchiya et al. ................. 99/483 |
| 5,863,580 | A | | 1/1999 | Reznik |
| 6,176,176 | B1 | * | 1/2001 | Dale et al. ........................ 99/470 |
| 6,303,166 | B1 | | 10/2001 | Kolbe et al. |
| 2008/0017623 | A1 | | 1/2008 | Dock |

FOREIGN PATENT DOCUMENTS

| | | |
|---|---|---|
| EP | 1 886 586 A1 | 2/2008 |
| FR | 2 741 228 A1 | 5/1997 |
| JP | 04183375 A | 6/1992 |
| JP | 10262625 A | 10/1998 |
| JP | 2003317900 A | 11/2003 |
| JP | 2003339537 A | 12/2003 |
| JP | 2004174024 A | 6/2004 |
| SU | 1 669 420 A1 | 8/1991 |
| WO | WO 8900384 A1 | 1/1989 |
| WO | WO 92 22180 A1 | 12/1992 |
| WO | WO 2007027109 A1 | 3/2007 |

* cited by examiner

*Primary Examiner* — Tu B Hoang
*Assistant Examiner* — Lindsey C Teaters
(74) *Attorney, Agent, or Firm* — Browdy and Neimark, PLLC

(57) ABSTRACT

Device for continuous heat-treatment of foods, equipped with a conduit made of a dielectric material in which a product to be treated flows, the conduit having at least a pair of electrodes located in the conduit which are subjected to a potential difference of at least 2000 Volts with a frequency of at least 25 Mhz, characterized in that a rotor made of dielectric material is located internally of the conduit, which rotor has a core from which a plurality of fins rises, which fins are distributed along a length of the rotor, are of a height such us to contact an internal surface of the conduit.

8 Claims, 4 Drawing Sheets

OHMIC DEVICE FOR HEAT-TREATING FOODS

Figure 1:
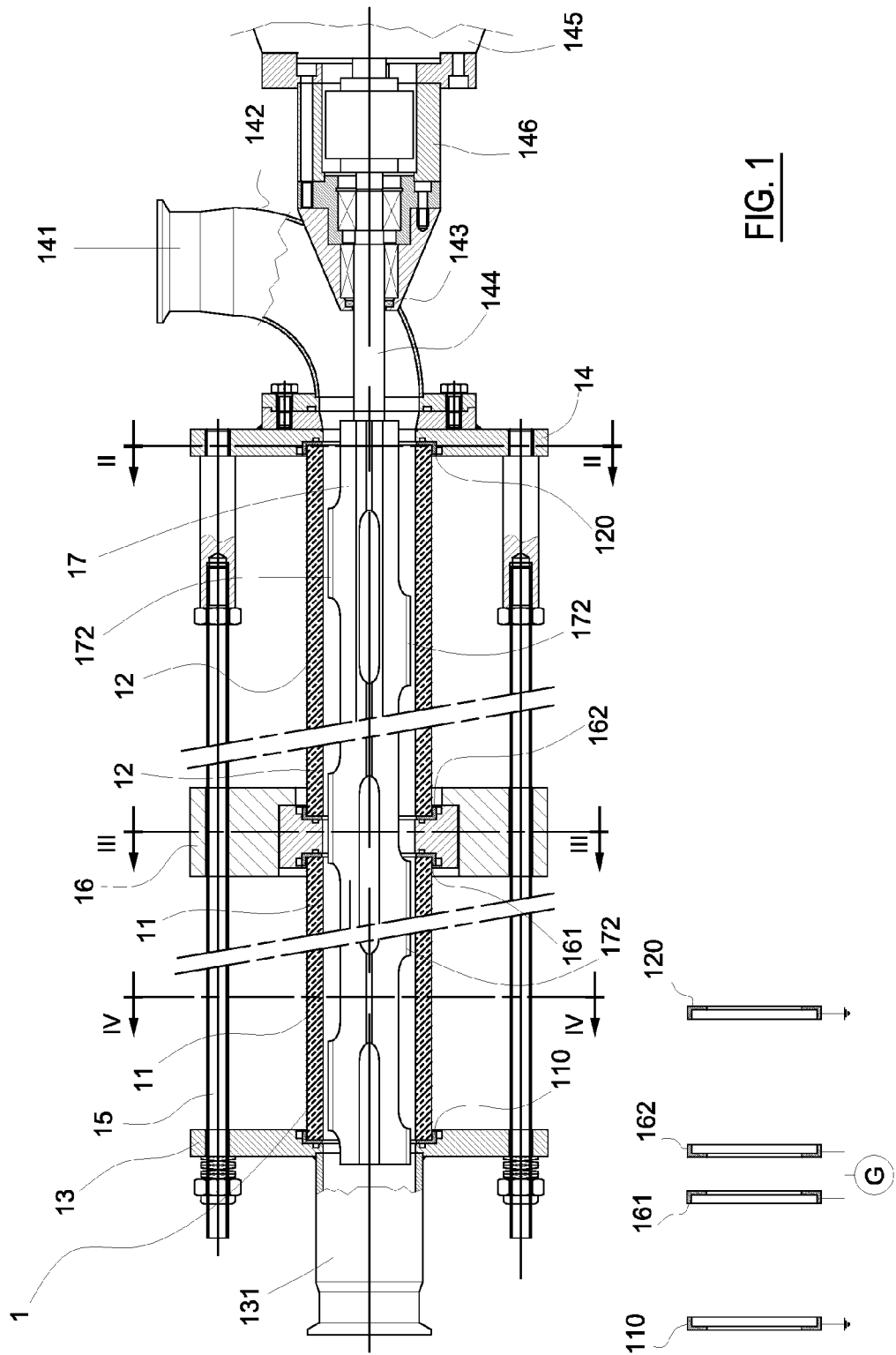

This patent relates to thermal treatments of foods, such as pasteurization or sterilization.

These treatments are well known to technicians in the food industry, and depending on the results to be obtained and the material to be treated they provide for the material to be heated up to a specified temperature and kept there for an appropriate period of time.

The characteristics of the systems for carrying out the process of pasteurization and sterilization must ensure that the treatment temperature is homogeneous inside the product, and is maintained for the time strictly necessary in a well-defined range of temperatures.

The range of allowable permanence time is very narrow, and outside it, the product suffers unacceptable degradation.

The product is in liquid form and sometimes presents inclusion of solid parts.

There are known systems which comprise a heat exchanger in which the product to be treated flows along a path placed in contact with the path of a heating fluid wherein the product to be treated and the heating fluid are separated by a heat conductive wall, usually metallic.

However, these systems present some adjusting difficulty and fail to guarantee a uniform temperature across the entire mass of the treated product.

In fact, the warm walls in contact with the product induce in the product temperatures inevitably higher in the areas close to the walls compared to the areas distant from the walls.

These systems are also poorly adapted to handle products containing dispersed solid parts, since the required temperature not always reaches the core of the solid parts.

For the treatment of products with an electrical conductivity, systems, that achieve the product heating by Joule's Law, passing a certain electric current in the product and using the electrical resistance of the product to produce heat and raise temperature, are known.

These systems are particularly suitable for continuous operation and comprise a conduit made of a dielectric material wherein the product to be treated flows; at the ends of the conduit there are two electrodes to which an alternate potential difference V, of value between 2,000 and 5,000 Volt, and having a frequency between 20 KHz and 25 KHz, is applied.

The potential difference generates a current that is inversely proportional to the electrical resistance R of the product, and which results into heat.

The electrodes are generally made of pure carbon, or stainless steel in order to avoid undesired electrolytic phenomena.

The process temperatures are generally comprised between 90° C. and 155° C., and the permanence time must be very precise in function of the treated product, of the process temperature and of the temperature gradients inside the product.

Even these systems are not free from drawbacks.

In fact, mainly because of its density and viscosity the product tends to adhere to the conduit walls creating a layer of material that moves at a slower speed than the speed of the product away from the wall, resulting in unwanted increase in permanence time in temperature of the product.

In addition, the laminar flow of the product near the walls can causes changes in the electrical resistance that adversely affect the homogeneity of the temperature of the treatment.

The purpose of this patent is to provide a solution that would eliminate, or at least significantly reduce the disadvantages of the prior art in a simple and economical solution.

In particular, the device comprises a cylindrical conduit made of a dielectric material in which a rotor is inserted and occupies its entire length.

At each end of the conduit an electrode, connected to one of the poles of an alternating electric current generator is placed, which applies to the poles a potential difference between 2,000 V and 5,000 V, at a frequency comprised between 20 MHz and 25 MHz.

Alternatively, several pairs of electrodes, subject to the same potential difference and placed in sequence, with alternating polarity, can be placed in the conduit.

Suitable junctions connect the ends of the conduit respectively to an inlet pipe for the product to be treated, and a discharge pipe of the treated product.

At least one of the junctions, preferably in the inlet connection, presents water seal passage means of the shaft of an electric engine.

An axial rotor, having a length preferably equal to that of the conduit, is connected to the shaft The rotor presents on its entire length shaped fins parallel to the axis that extend to touch the inner wall of the conduit, and have the dual function of keeping the walls clean from any layers of product that tend to adhere because of viscosity, and keeping the product shuffled.

The merits and the constructional and functional characteristics of the invention will be clear from the detailed description that follows, which illustrates together with the help of the annexed drawings, a preferred embodiment given by way of example, but not limiting.

FIG. 1 shows the invention seen in broken axial section.

Figure 2:
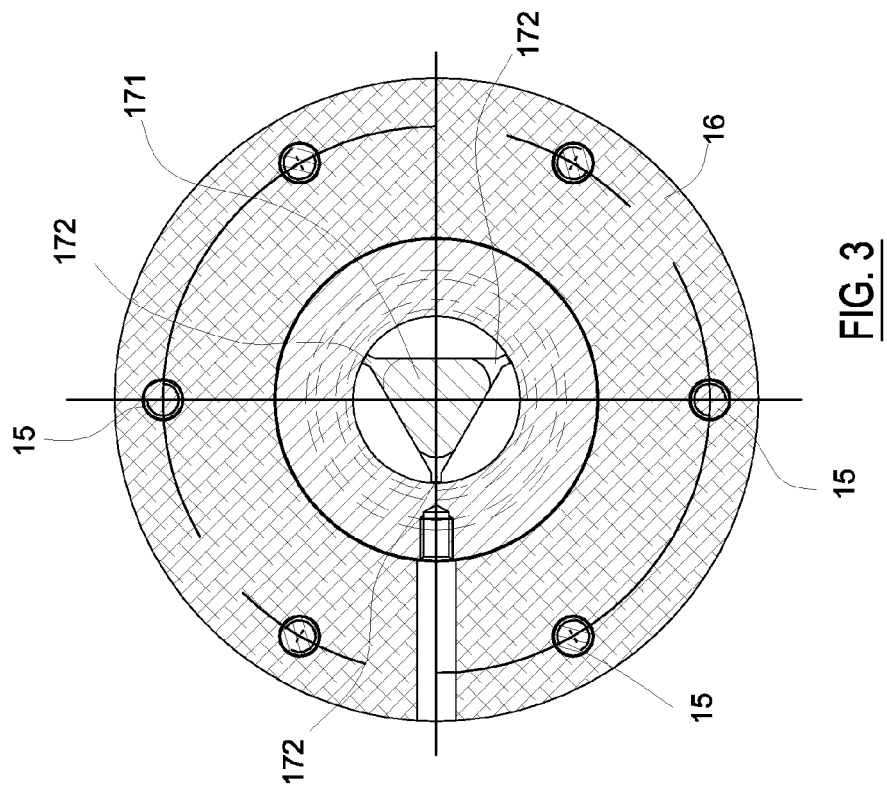

The FIG. 2 is the section II-II of FIG. 1.

Figure 3:
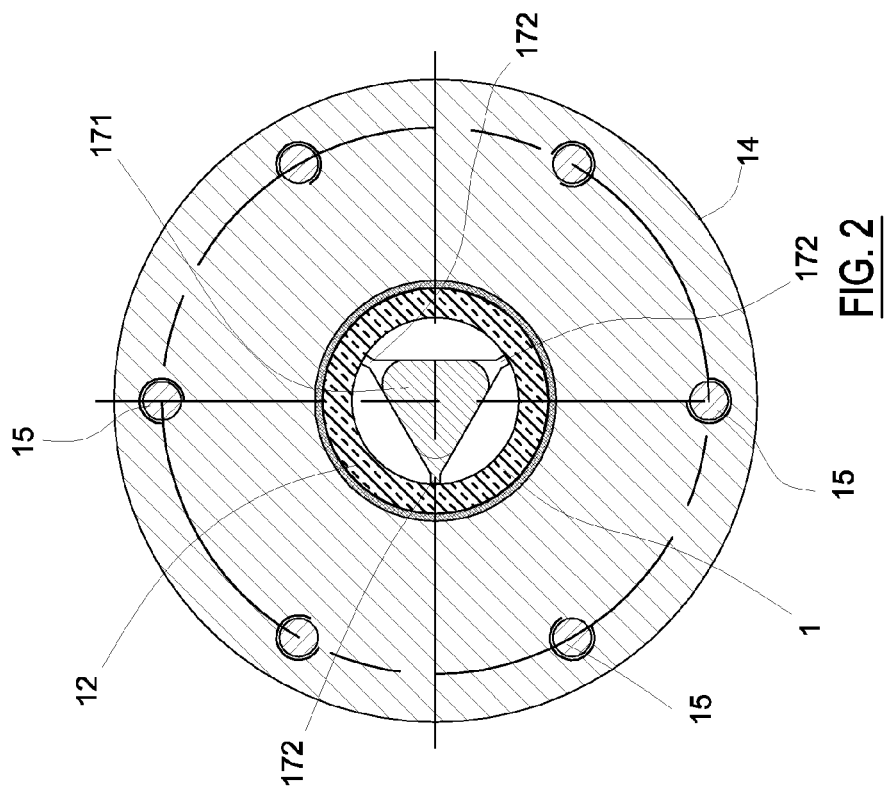

The FIG. 3 is the section III-III of FIG. 1.

Figure 4:
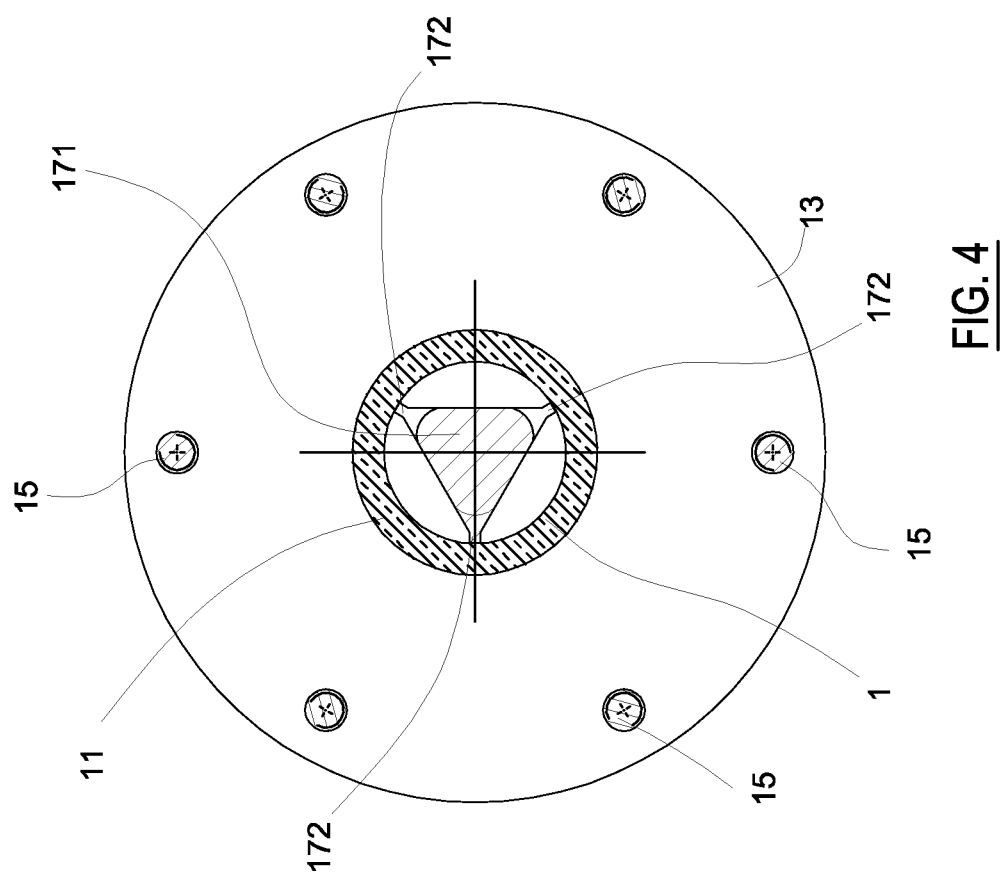

The FIG. 4 is the section IV-IV of FIG. 1.

Figure 5:
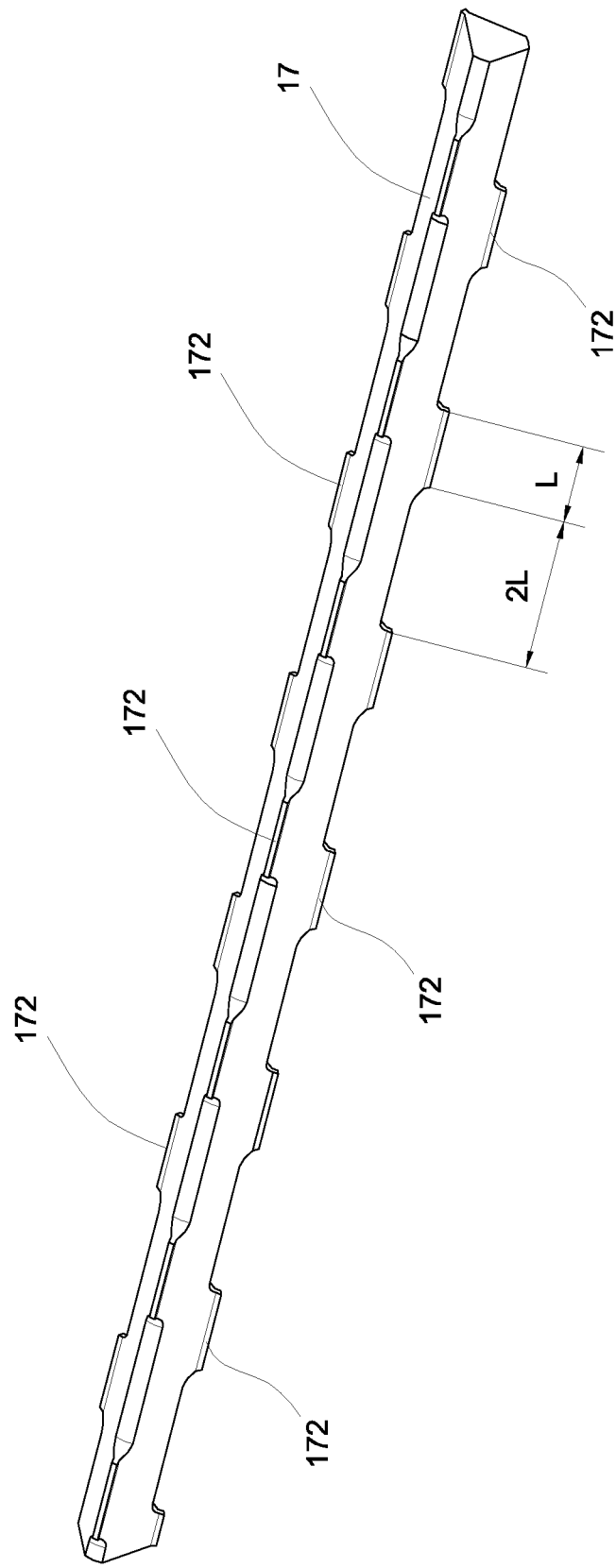

THE FIG. 5 is a perspective view of the rotor.

From the figures a conduit 1 made of a dielectric material PYREX can be seen, which in this case is known as manufactured by specialized companies. The diameter of conduit is equal to 70 mm, and can be between 40 and 100 mm.

The length of the conduit, in the case illustrated, is equal to 500 mm, and can be between 300 and 900 mm.

Its thickness is not an essential feature of the invention, and, in the illustrated example, is equal to 10 mm.

The conduit 1 is comprised between two flanges 13 and 14 connected by six tie-beams 15.

More precisely, the conduit is separated into two sections 11 and 12 by a central flange 16 crossed by said tie-beams. Even the three flanges 13, 14 and 16 are made of dielectric material.

The flanges 13 and 14 support, in addition to the ends of sections 11 and 12, also an electric pole, 110 and 120 respectively, ring-shaped, connected to ground.

The flange 16 supports, in addition to the ends facing he two sections 11 and 12, also a pair of annular electric poles 161 and 162 respectively.

These poles are both connected to a voltage generator V at a voltage value comprised between 2000 and 5000 V.

The flange 13 also supports the junction of the inlet pipe 131 of the material to be treated, while the flange 14 supports the junction of the discharge pipe 141 of the treated product.

Both the pipe 131 and the junction 141 are in AISI 316 L.

The junction 141 comprises a body 142 in which water seal means 143 for the shaft 144 of the engine are placed.

The shaft 144 is suitably supported within the sleeve 146, to which the motor housing 145 also heads.

The shaft 144 extends up within the flange 14, where it is coupled to a rotor 17.

The motor is apt to impart to the rotor a speed comprised between 200 revolutions per minute (rpm) and 800 rpm.

The rotor 17 is made of dielectric material, has a length equal to the total length of the conduit 1.

It has a core 171 having triangular section and rounded edges.

The core carries, at the edge of each corner, a succession of fins 172, parallel to the axis, which fins raise from their respective edge to touch the inner wall of the conduit 1.

The edges of each corner have a succession of fins having a length L and being distanced from one other by a distance equal to 2 L.

The fins of the edge of each corner are staggered with respect to the fins of adjacent edges, and, in each section of the rotor orthogonal to the axis, a single fin is placed.

The electric engine is apt to bring to rotation the rotor at a speed comprised between 200 rpm and 800 rpm and correlated to the speed of the flow of the treated product.

EXAMPLE

With a device like the one shown in FIG. 1, where the PERSPEX conduit has a diameter of 70 mm, a length of 500 mm and a thickness of 10 mm, the treatment of 800 kg/h of meshed asparagus, having a viscosity of 450 Cps and an inlet temperature of the material equal to 80° C., was performed.

Applying a 3800 V voltage to the electrodes, and with a speed of rotation of the rotor of 300 rpm, an outlet temperature of 130° C. was found, congruous with the desired results.

Obviously the invention is not limited to the example described above, and variations and improvements may be made without going beyond the scope of the following claims.

The invention claimed is:

1. A device for continuous heat-treating of foods, comprising:
   a conduit made of a dielectric material in which a product to be treated flows, the conduit having at least a pair of electrodes located in the conduit which are subjected to a potential difference of at least 2000 Volts with a frequency of at least 25 MHz, and
   a rotor made of a dielectric material is located internally of the conduit, said rotor having a core from which a plurality of fins parallel to the rotor axis rises, said fins having a section of any shape and are distributed along a length and over a whole perimeter of the rotor, so that any section of the rotor orthogonal to the rotor axis comprises one and only one fin, and has a height such as to contact an internal surface of the conduit, the fins being staggered with respect to each other in order to contact and clean each portion of the internal surface of the conduit.

2. The device of claim 1, wherein the core of the rotor exhibits a straight triangular section and the fins rise from edges of corners thereof.

3. The device of claim 2, wherein the fins have a triangular section having walls which are coplanar to walls of the core.

4. The device of claim 2, wherein the fins are parallel to the axis of the rotor, have a dimension L, and are distanced from one another by a distance which is 2L.

5. The device of claim 1, wherein the rotor extends at least over a whole field subjected to the potential difference.

6. The device of claim 1, wherein the conduit made of dielectric material in which the product to be treated flows is of a length between 300 mm and 900 mm.

7. The device of claim 1, wherein a tension applied to the at least a pair of electrodes is between 2000 Volts and 5000 Volts and the frequency is between 25 MHz and 50 MHz.

8. The device of claim 1, wherein a rotation velocity of the rotor is between 200 revolutions per minute and 800 revolutions per minute.

* * * * *